(12) United States Patent
Hadar

(10) Patent No.: US 8,972,951 B2
(45) Date of Patent: Mar. 3, 2015

(54) EMBEDDING PERFORMANCE MONITORING INTO MASHUP APPLICATION DEVELOPMENT

(71) Applicant: CA, Inc., Islandia, NY (US)

(72) Inventor: Eitan Hadar, Nesher (IL)

(73) Assignee: CA, Inc., New York, NY (US)

( * ) Notice: Subject to any disclaimer, the term of this patent is extended or adjusted under 35 U.S.C. 154(b) by 144 days.

(21) Appl. No.: 13/625,339

(22) Filed: Sep. 24, 2012

(65) Prior Publication Data

US 2014/0089901 A1 Mar. 27, 2014

(51) Int. Cl.
*G06F 9/44* (2006.01)
*G06F 17/30* (2006.01)

(52) U.S. Cl.
CPC ...... *G06F 17/3089* (2013.01); *G06F 17/30997* (2013.01)
USPC .......................................................... 717/127

(58) Field of Classification Search
USPC .......................................................... 717/127
See application file for complete search history.

(56) References Cited

U.S. PATENT DOCUMENTS

| | | | |
|---|---|---|---|
| 8,458,600 B2 * | 6/2013 | Dheap et al. | 715/751 |
| 2007/0271375 A1 * | 11/2007 | Hwang | 709/224 |
| 2009/0313601 A1 * | 12/2009 | Baird et al. | 717/106 |
| 2011/0161833 A1 * | 6/2011 | Dheap et al. | 715/753 |
| 2012/0030592 A1 * | 2/2012 | Cui et al. | 715/763 |
| 2012/0047195 A1 * | 2/2012 | Gisolfi et al. | 709/201 |
| 2013/0346880 A1 * | 12/2013 | Dheap et al. | 715/753 |

OTHER PUBLICATIONS

Picozzi et al., Quality-Based Recommendations for Mashup Composition, 2010, ICWE 2010 Workshops, LNCS 6385, pp. 360-371.*
Guo et al., Partial Information Extraction Approach to Lightweight Integration on the Web, ICWE 2010 Workshops, LNCS 6385, pp. 372-383.*
Cappiello et al., Quality-Aware Mashup Composition: Issues, Techniques and Tools, Quality of Information and Communications Technology (QUATIC), Lisbon, Date Sep. 3-6, 2012.*
Daniel et al., "Next in Mashup Development: User-Created Apps on the Web", IT Professional, Issue Date: Sep.-Oct. 2011.

(Continued)

*Primary Examiner* — Don Wong
*Assistant Examiner* — Reshaun M Finkley
(74) *Attorney, Agent, or Firm* — Myers Bigel Sibley & Sajovec, P.A.

(57) ABSTRACT

Computer systems, methods and program products can facilitate embedding performance monitoring into a mashup application that is being created in a mashup application development environment. A mashup application analyzer identifies mashup application performance monitors that are applicable to a mashup application that is being created in a mashup application development environment. An instructor is provided to instruct the mashup application development environment to embed selected ones up of the performance monitors into the mashup application that is being created in the mashup application development environment, responsive to a selection from the performance monitors. A provisioner instructs the mashup application development environment how to provision the selected ones of the mashup application performance monitors in the mashup application that is being created in the mashup application development environment, responsive to a selection of provisioning options for the selected ones of the mashup application performance monitors.

15 Claims, 5 Drawing Sheets

(56) References Cited

OTHER PUBLICATIONS

Cherbakov et al., "Changing the corporate IT development model: Tapping the power of grassroots computing" *IBM Systems Journal,* 2007, vol. 46 Issue:4.

Yu et al., "Understanding Mashup Development," IEEE Internet Computing, vol. 12, No. 5, 2008, pp. 44-52.

Weiss et al., "Modeling the Mashup Ecosystem: Structure and Growth," R&D Management, vol. 40, No. 1, 2010.

Balasubramaniam et al., "Situated Software: Concepts, Motivation, Technology, and the Future," IEEE Software, vol. 25, No. 6, 2008, pp. 50-55.

Janner et al., "Patterns for Enterprise Mashups in B2B Collaborations to Foster Lightweight Composition and End User Development," Proc. IEEE Int'l Conf. Web Services (ICWS 09), IEEE CS Press, 2009, pp. 976-983.

Picozzi et al., "Quality-Based Recommendations for Mashup Composition," ComposableWeb 2010, LNCS 6385, Springer, 2010, pp. 360-371.

* cited by examiner

US 8,972,951 B2

EMBEDDING PERFORMANCE MONITORING INTO MASHUP APPLICATION DEVELOPMENT

BACKGROUND

The present disclosure relates to computer systems, methods and program products, and in particular, to mashup application development.

Mashup applications are increasingly being used for computer software application development. A mashup application is a software application that uses and combines data, presentation or functionality from two or more sources or other software applications to create new applications. Mashup applications may use situational data that may be created, for example, from social network or other situational data or software application. Mashup creating tools may be provided as part of a Platform as a Service (PaaS) cloud computing service that provides a computing platform and a Software as a Service (SaaS). In contrast with conventional application development by a programmer or other Information Technology (IT) professional, mashup applications generally require less programming skills. Mashup application development tools support visual wiring of graphical user interfaces, widgets, services and components together, for quick development by an end user, to produce enriched results.

BRIEF SUMMARY

Various embodiments described herein can provide computer systems, methods and program products that can facilitate embedding performance monitoring into a mashup application that is being created in a mashup application development environment. In some embodiments a mashup application performance monitoring system comprises a mashup application analyzer to identify mashup application performance monitors that are applicable to a mashup application that is being created in a mashup application development environment. An instructor is provided to instruct the mashup application development environment to embed selected ones up of the mashup application performance monitors into the mashup application that is being created in the mashup application development environment, responsive to selection of the selected ones of the mashup application performance monitors from the mashup application performance monitors that are applicable to the mashup application that is being created in the mashup application development environment.

In some embodiments the mashup application analyzer may comprise a library of mashup application performance monitors that are part of a mashup application run time environment of the mashup application development environment, and a potential match analyzer to analyze the mashup application that is being created in the mashup application development environment relative to the mashup application performance monitors in the library of mashup application performance monitors. A match identifier is provided to identify matching ones of the mashup application performance monitors that are applicable to the mashup application that is being created in the mashup application development environment, responsive to the potential match analyzer. A presenter is also provided to present the matching ones of the mashup application performance monitors that are applicable to the mashup application that is being created in the mashup application development environment, at a user device for the selection.

In some embodiments, the instructor is further to instantiate the selected ones of the mashup application performance monitors that are to be embedded into the mashup application that is being created, in some embodiments responsive to a selection of the selected ones of the mashup application performance monitors from the mashup application performance monitors that are applicable to the mashup application that is being created in the mashup application development environment. The instructor is further to generate performance monitoring scripts for the selected ones of the mashup application performance monitors and to provide the performance monitoring scripts to the mashup application development environment in some embodiments for embedding in the mashup application that is being created. Moreover, in some embodiments the instructor is further to instantiate the selected ones of the mashup application performance monitors according to a selected configuration, in some embodiments responsive to the selection of the selected ones of the mashup application performance monitors from the mashup application performance monitors that are applicable to the mashup application that is being created in the mashup application development environment and further responsive to selection of a configuration for the selected ones of the mashup application performance monitors.

Some embodiments may further comprise a provisioner to instruct the mashup application development environment how to provision (i.e. deploy and activate) the selected ones of the mashup application performance monitors in the mashup application that is being created in the mashup application development environment, responsive to a selection of provisioning options for the selected ones of the mashup application performance monitors.

In some embodiments, the provisioner may comprise a provisioning controller to identify a first subset of the selected ones of the mashup application performance monitors that will be active during testing of the mashup application that is being created and to identify a second subset of the selected ones of the mashup application performance monitors that will be active during production of the mashup application that is being created, responsive to selection of provisioning options for the selected ones of the mashup application performance monitors. A converter is provided to convert the first and second subsets of mashup application performance monitors into graphical user displays, and to instruct a performance monitoring tool of the mashup application development environment to populate the graphical user displays during testing and production of the mashup application that is being created.

Various embodiments have been described above in connection with a computer system. However, various other embodiments described herein can provide analogous mashup application performance monitoring methods and mashup application performance monitoring computer program products.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

Figure 1:
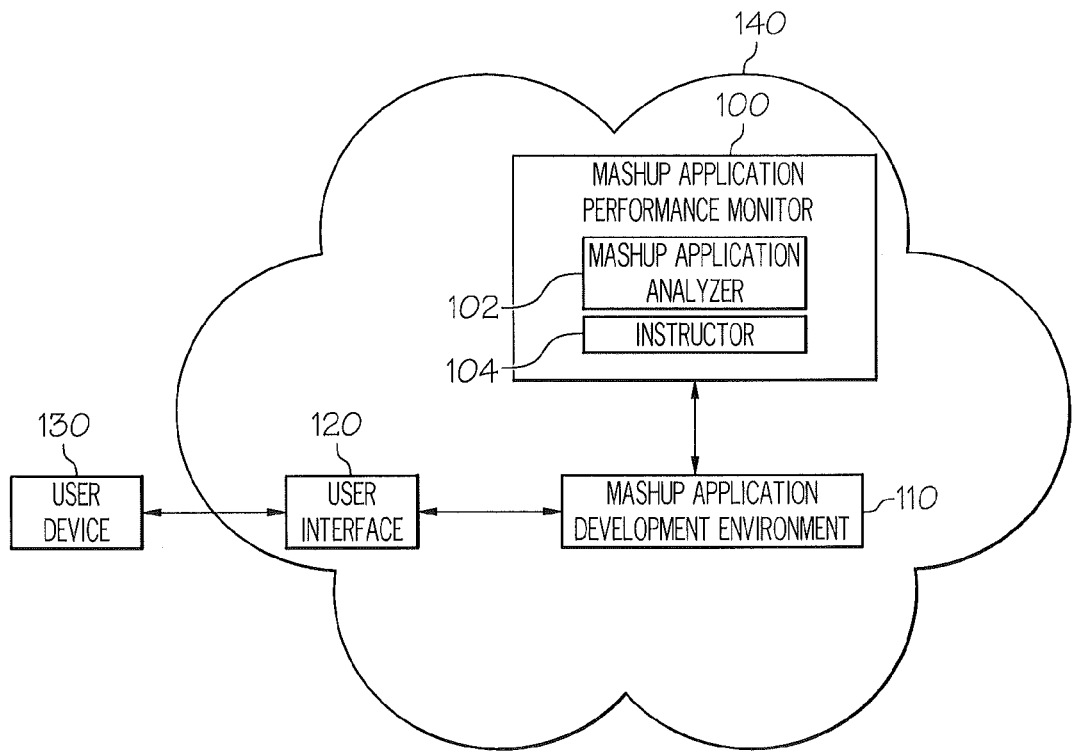
FIG. 1 is a block diagram of a cloud computing environment including mashup application performance monitor systems, methods and computer program products according to various embodiments described herein.

FIG. 1 is a block diagram of a cloud computing environment including a mashup application performance monitoring system, method and computer program product according to various embodiments described herein. Cloud computing environment 140 in which the subject matter of various embodiments described herein can function may provide various computing resources that are interconnected by one or more communications networks. The computer systems that make up the cloud computing environment 140 may include one or more enterprise, application, personal, pervasive and/or embedded computer systems that are operable to receive, transmit, process and store data using any suitable combination of software, firmware and/or hardware. The network may be any conventional wired and/or wireless virtual and/or actual network including local and/or wide area networks including all or a portion of the global computer network known as the Internet, and may be distributed over many locations. It will be understood, however, that although a cloud computing environment 140 is illustrated in FIG. 1, various embodiments described herein may also be embodied in a conventional client/server environment that may be distributed over one or more computer systems or included in a single standalone computer system.

Still referring to FIG. 1, a mashup application performance monitoring system, method and computer program product 100 may comprise a mashup application analyzer 102 to analyze a mashup application that is being created in a mashup application development environment 110, to identify, and in some embodiments present, mashup application performance monitors that are applicable to the mashup application that is being created in the mashup application development environment 110. The mashup application performance monitors that were identified may be presented to a user, such as a mashup application creator, at a user device 130 via a user interface 120. The mashup application performance monitoring system, method and computer program product 100 further comprises an instructor 104 to instruct the mashup application development environment 110 to embed selected ones of the performance monitors that were identified and presented into the mashup application that is being created in the mashup application development environment 110. The instructor 104 is responsive to a selection, for example at the user device 130 via the user interface 120, from the performance monitors that were identified and presented. Accordingly, embedded performance monitoring may be provided during mashup application creation.

It will be understood that the user interface 120 may be contained, at least partially within the mashup application development environment 110, at least partially within the mashup application performance monitor 100, and/or at least partially within the user device 130, or may be independent of the mashup application development environment 110, the mashup application performance monitor 100 and the user interface 130, as illustrated in FIG. 1. Moreover the mashup application performance monitor 100 may communicate directly with the user interface 120 or may communicate with the user interface 120 indirectly, for example, via the mashup application development environment 110 as illustrated in FIG. 1.

Figure 2:
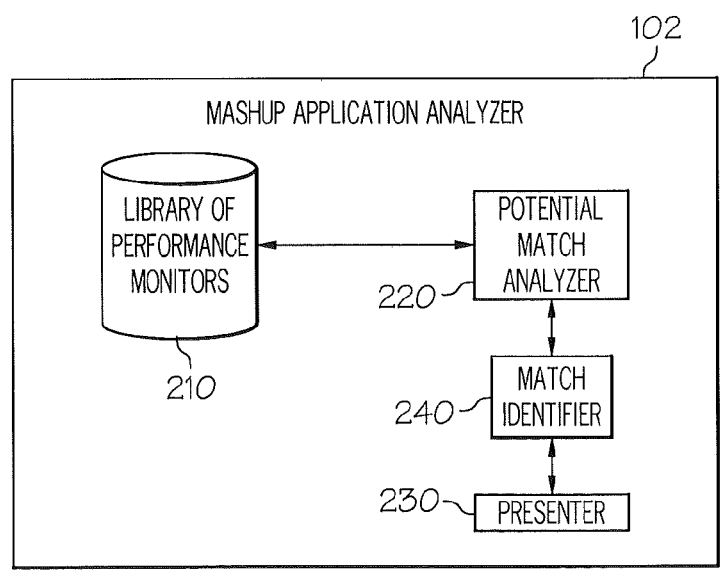
FIG. 2 is a block diagram of a mashup application performance analyzer according to various embodiments described herein.

FIG. 2 is a block diagram of mashup application analyzer, such as the mashup application analyzer 102 of FIG. 1, according to various embodiments described herein. Referring to FIG. 2, mashup application analyzer 102 includes a library of performance monitors 210 that are part of a mashup application runtime environment of a mashup application development environment, such as the mashup application development environment 110 of FIG. 1. A potential match analyzer 220 is provided to analyze the mashup application that is being created in the mashup application development environment 110 relative to the performance monitors in the library of performance monitors 210. A match identifier 240 is provided to identify matching ones of the performance monitors that are applicable to the mashup application that is being created in the mashup application development environment 110, responsive to the potential match analyzer 220. A presenter 230 is provided to present the matching ones of the mashup application performance monitors that are applicable to the mashup application that is being created in the mashup application development environment, for the selection for example at the user device 130 of FIG. 1 via the user interface 120 of FIG. 1.

Figure 3:
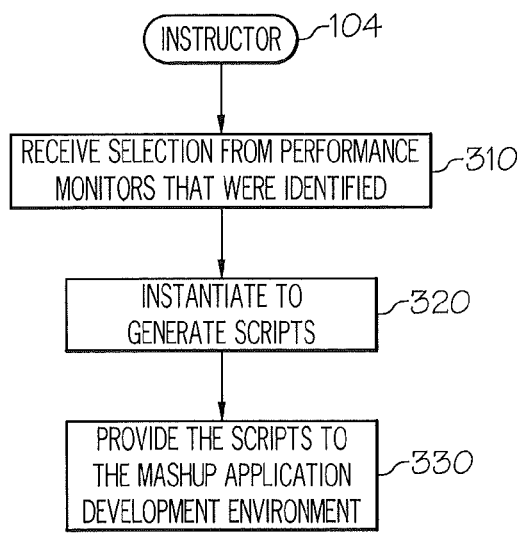
FIG. 3 is a flowchart of operations that may be performed by an instructor according to various embodiments described herein.

FIG. 3 is a flowchart of operations that maybe performed by an instructor, such as the instructor 104 of FIG. 1, according to various embodiments described herein. In embodiments of FIG. 3, at Block 310, the instructor 104 instantiates the selected ones of the performance monitors that were identified at the user device 130 via the user interface 120. In some embodiments the instructor 104 is responsive to a selection from the performance monitors that were identified and presented at the user device 130 via at the user interface 120. At Block 320, the instructor generates performance monitoring scripts for the selected ones of the performance monitors that were instantiated. At Block 330, the scripts are provided to the mashup application development environment, for example for embedding in the mashup application that is being created. In some embodiments, the instantiation of Block 320 further instantiates the selected ones of the performance monitors according to a selected configuration, responsive to the selection, at the user device 130 via the user interface 120, from the performance monitors that were identified and further responsive to selection of a configuration for the performance monitors that were selected.

Figure 4:
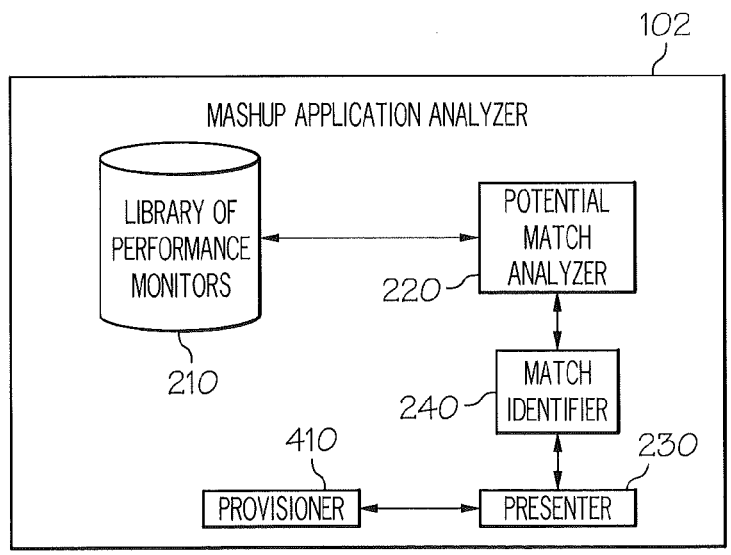
FIG. 4 is a block diagram of a mashup application performance analyzer according to various embodiments described herein.

FIG. 4 illustrates other embodiments of a mashup application analyzer, such as the mashup application analyzer 102 of FIG. 1. These embodiments add a provisioner 410 to instruct the mashup application development environment how to provision (i.e. deploy and activate) the selected ones of the performance monitors in the mashup application that is being created in the mashup application development environment, responsive to selection of provisioning options for the selected ones of the performance monitors that were identified, for example at the user device 130 via the user interface 120.

Figure 5:
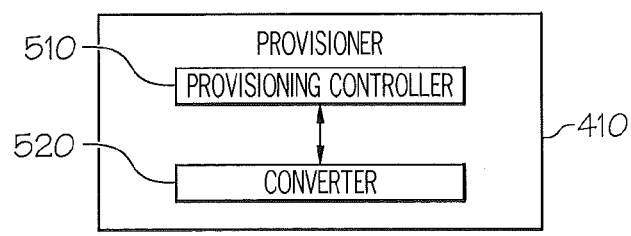
FIG. 5 is a block diagram of a provisioner according to various embodiments described herein.

FIG. 5 is a block diagram of a provisioner, which may correspond to the provisioner Block 410 of FIG. 4, according to various embodiments described herein. As illustrated in FIG. 5, the provisioner may comprise a provisioning controller 510 to identify a first subset of the selected ones of the performance monitors that will be active during testing of the mashup application that is being created and to identify a second subset of the selected ones of the performance monitors that will be active during production of the mashup application that is being created, responsive to a selection of provisioning options for the selected ones of the performance monitors, for example at the user device 130 via the user interface 120. It will be understood that the first and second subsets of the selected ones of the performance monitors may have overlapping members if a performance monitor is to be active during testing and production of the mashup application that is being created. Moreover a given subset may have no members if, for example, all performance monitors will be active during testing but none will be active during production or vice versa. A converter 520 is configured to convert the first subset of the performance monitors and the second subset of performance monitor into graphical user displays and to instruct a performance monitoring tool of the mashup application development environment to populate the graphical user displays during testing and production of the mashup application that is being created.

Additional discussion of various embodiments described herein will now be provided. Specifically, various embodiments described herein can embed monitoring and profiling assurance tools into mashup applications during their creation phase in a simple graphical manner, as well as provide testing (using, for example, full monitoring) and production (using, for example, partial monitoring) versions for the same mashup application. Thus, in the domain of mashup application development and new visual domain-specific development paradigms, various embodiments described herein can combine embedded monitors with mashup application graphical tools, enabling simplified IT management and service assurance IT concerns.

As part of a Web application creation, and in particular in mashup application development, various embodiments described herein can incrementally and proactively insert IT quality aspects on the parts of a potential Web application/situational application (i.e., service, data flow or user interface components). Accordingly, various embodiments described herein can enable the evolution of overall IT application deployment and performance quality in a mashup application. In addition, various embodiments described herein can provide monitored information to mature the quality of mashup applications created by end-users and semi-professionals towards an enterprise IT grade.

It is desirable to increase the performance quality in the large number of rapidly created mashup applications that are increasingly being composed by professional and non-professional developers. The development environments can be provided by PaaS providers, or modern visual (model-driven) development vendors. Unfortunately, monitoring and assurance concerns are not a seamlessly interweaved part of PaaS or software development tools. Currently, many monitoring and quality concerns (service assurance monitors) are inserted to production environments of well-known and managed Web applications, in a conventional design-build-evaluate process. Monitors can be inserted as wrappers over protocols and/or embedded within a Web application code. Regardless of the approach, these technologies are generally well controlled, targeted primarily for professionals, and have a long cycle of build-test-deploy. In contrast, for light-weight development processes, such as for agile mashup application development, this approach may slow and hamper mashup application and situational application development and supporting tools, where design-build-test-deploy are occurring at much higher frequencies and with a leaner development process, if at all.

Mashup application composers (e.g., an IT shop professional or an end user in the enterprise or elsewhere) generally use mashup application technologies to easily and quickly create Web-based situational or other applications that cater to the business or department immediate needs. Mashup application composing can be done slowly, in text editing of integration glue code, or visually ("what you see is what you get") and quickly using tools such as "DASHMASH" mashup environment or "MashArt" as described for example in "Next in Mashup Development: User-Created Apps on the Web", IT Professional, Sept.-Oct. 2011.

In order to provide a user innovation toolkit, mashup application development environments can provide simplification of development languages and tools that can wrap technical difficulties. For example, mashup application development platforms and tools combine both Service Oriented Application (SOA) and social aspects, in particular for end users or IT professionals, leveraging the potential of the programmable Web. New development tools for mashup applications can combine visual editing with architectural style (e.g., Simple Object Access Protocol (SOAP) services vs. Representational State Transfer (RESTful) services vs. widget application programming interfaces), adopted programming languages (e.g., client side such as JAVASCRIPT programming language vs. server side such as Ruby, or server side Business Process Execution Language (BPEL) engines), a data representation (e.g., Extensible Mashup Language (XML) vs. Java Script Object Notation (JSON)), component operability and interoperability (e.g., the multiplicity of application programming interfaces targeting different technologies) and an ability to compose them all in a single development environment. Examples of existing tools that may be provided by CA Technologies include "Application Performance Monitoring/Wily" that can assist in evaluating performance of Web applications in terms of number and duration of passing transactions over Web applications and assisting in detecting bottlenecks. Other existing CA Technologies tools such as "AppLogic Design Studio" and "Appstore" can enable the design and deployment of a composite IT system from its infrastructure components (including appliances), as well as reuse readymade blueprints for rapid instantiation and activation. Yet other existing CA Technologies tools such as "Service Operations Insight" can enable a user to compose/unify software components, and define how to compute aggregated operational metrics.

Various embodiments described herein can provide proactive monitoring that assists application developers (not necessarily IT operation mangers) to decide, design, automate, install, and combine IT monitors while they are developing Web-based mashup applications. In the future of engineering, combined development and IT operation is a new domain. This domain of situational applications is integrated with a new emerging area known as "DevOps". DevOps is an emerging organizational model for integrated development and operations teams to address how service releases are managed (design, development, testing and deployment) to reduce release cycle times while improving consistency. Thus, various embodiments described herein can provide for design and development of mashup applications to include monitors for IT operation. Such a combined approach for Service Assurance and IT development does not appear to exist today in mashup application development.

Figure 6:
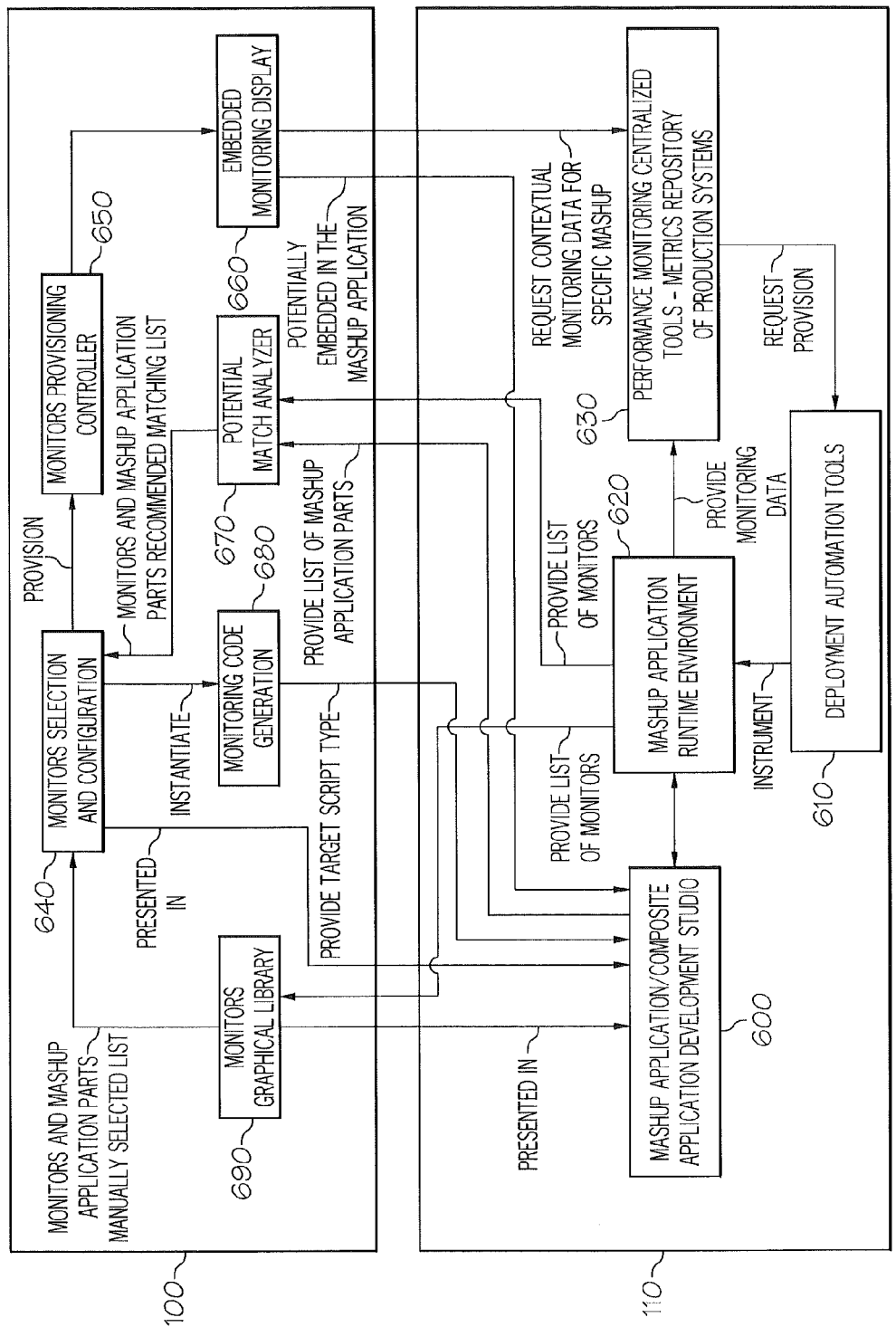
FIG. 6 is a block diagram of mashup application performance monitoring systems, methods and computer program products according to various embodiments described herein that interface with a mashup application development environment according to various embodiments described herein.

FIG. 6 is a more detailed block diagram of a mashup application performance monitor, such as the mashup application performance monitor 100 of FIG. 1, according to various embodiments described herein for use with a mashup application development environment, such as the mashup application development environment 110 of FIG. 1. The mashup application development environment 110 may include a mashup application/composite app development studio 600 such as "DASHMASH" mashup environment, "AppLogic" and/or other mashup composite application development studios. A mashup application runtime environment 620 is also provided, using for example, a PaaS vendor such as Microsoft® Windows Azure, a grid manager such as Yahoo!® Pipes™, etc. Performance monitoring centralized tools 630, such as "CA® APM", are provided. The performance monitoring centralized tools 630 receive a request to provision agents and to provide monitoring data, and provides the aggregated monitoring information to a display component. It uses deployment information to conduct the actual provisioning or activation of agents. Moreover, if provisioning already exists, the system can delegate existing measurements without additional deployment. Finally, the mashup application development environment 110 also includes deployment automation tools 610, such as "CA® Server Automation" or "CA® AppLogic Grid", which conduct the instrumentation of agents for a mashup application.

Still referring to FIG. 6, the mashup application performance monitor 100 includes a monitors graphical library 690, which may correspond to the library of performance monitors 210 described above. A monitors selection and configuration Block 640 may correspond to the presenter 230 described above. A potential match analyzer Block 670 may correspond to the potential match analyzer 220 and match identifier 240 described above. A monitoring code generation Block 680 may correspond to the instructor Block 104 described above. A monitors provisioning controller Block 650 may correspond to the provisioner Block 410 described above. Finally the embedded monitoring display 660 may correspond to the translator 520 described above.

A more detailed description of operations of Blocks 640-690 of FIG. 6 according to various embodiments described herein will now be provided. Specifically, the monitors graphical library 690 contains visually and textually selected monitors that can be injected into the mashup application development environment 110. The list of presented monitors that are provided to the monitors graphical library 690 may contain only monitors that the mashup application runtime environment 620 can support or integrate to/with. Adding monitors to the supported list may be performed elsewhere. The monitors presented in the monitors graphical library 690 may contain meta-data that describes what types of assets they can monitor (instrument), what type of metrics they can provide (output), what type of input they require, and what type of output they can provide as a metric/measurement source. Users can "drag and drop" monitors on selected mashup application components (services, data flow, UI, etc.), and configure one monitor at a time, or groups of monitored parts. The monitors may be presented by the monitors graphical library 690 in the mashup application development studio 600 and/or in another user interface.

Figure 7:
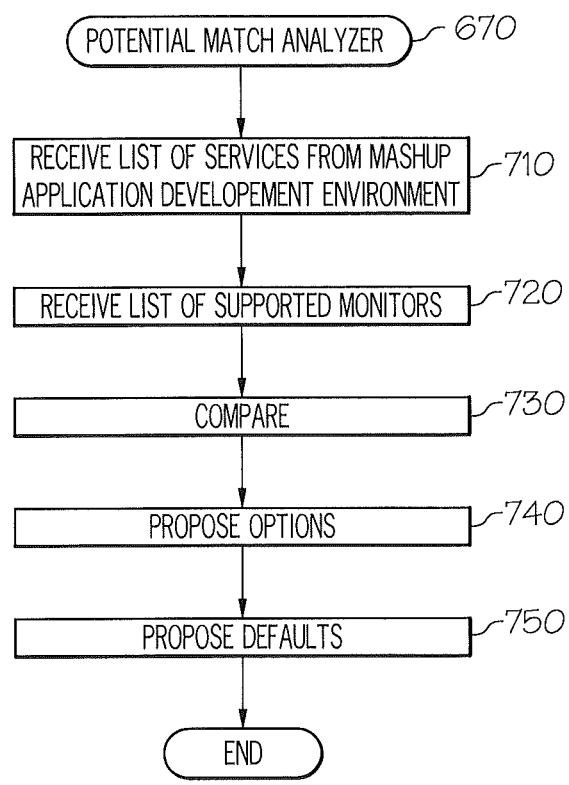
FIG. 7 is a flowchart of operations that may be performed by a potential match analyzer according to various embodiments described herein.

The potential match analyzer 670 visually proposes which monitors can be provided for which mashup application part (inner services). FIG. 7 is a flowchart of operations that may be performed by the potential match analyzer 670 of FIG. 6. As illustrated in FIG. 7, the potential match analyzer 670 receives as an input a list of services in the proposed mashup application from the mashup application development studio 600, as shown in Block 710. A list of supported monitors is received from the mashup application runtime environment 620, as shown at Block 720. At Block 730, by comparing data types and mashup application parts schemas and meta-data between the mashup application parts and available monitors, such as may be currently performed in "DASHMASH" mashup environment, and/or using schema matching algorithms, the potential match analyzer 670 can propose options at Block 740, as to what service can be monitored, with which monitor, and how, and provide a list of options. The potential match analyzer 670 can also propose default integration or "best practices" according to the matches, at Block 750. The default integration can include default mashup application performance monitors unless they are deselected.

Referring back to FIG. 6, the monitors selection and configuration Block 640 receives the list of potential monitors for the mashup application from the potential match analyzer 670, and the selection from the monitors graphical library 690. The monitors selection and configuration Block 640 enables the user to manually evaluate the level of match, and "select/confirm/configure" a monitor to be an instrument for a certain service. The user can also define the type of monitor (production or testing) which will change the weaving of the mashup application between testing and production. User interaction with the monitors selection and configuration Block 640 may take place in the mashup application development studio 600 and/or in another user interface. The configuration Block 640 sets the monitoring Domain Specific Language (DSL) for each monitor and each service, as recommended as a default by the match analyzer 670, and/or as a result of the end-user configuration. A list of selected services (targets), their selected associated monitors, and selected configuration is then provided, for example, to the monitoring code generation Block 680 and/or to the monitors provisioning controller Block 650 as will now be described.

The monitoring code generation Block 680 creates the scripts of the monitoring DSL into the selected mashup application integration code, according to the mashup application runtime environment 620. By transforming the DSL meta-configuration into the target runtime environment 620, the monitors are abstracted and separated from the tactical execution of the mashup application, enabling the monitors to be movable by the dynamic grid management of a production (infrastructure) environment.

The monitors provisioning controller 650 decides and controls which probe/monitor will be active according to a testing or production environment, as set by the user. As a result, not all monitors will be provisioned similarly in different environments. The monitors provisioning controller 650 informs the embedded monitoring display 660 what type of monitoring is required and when. According to the mashup application structure, this controller 650 can decide which monitor is required to support other monitors, to thereby structure monitor dependencies. For example, assuming a derived monitor in production requires another monitor, but is configured as "for testing only", the monitors provisioning controller 650 will inform the end-user of the conflict, and request a resolution in the monitoring design.

Figure 8:
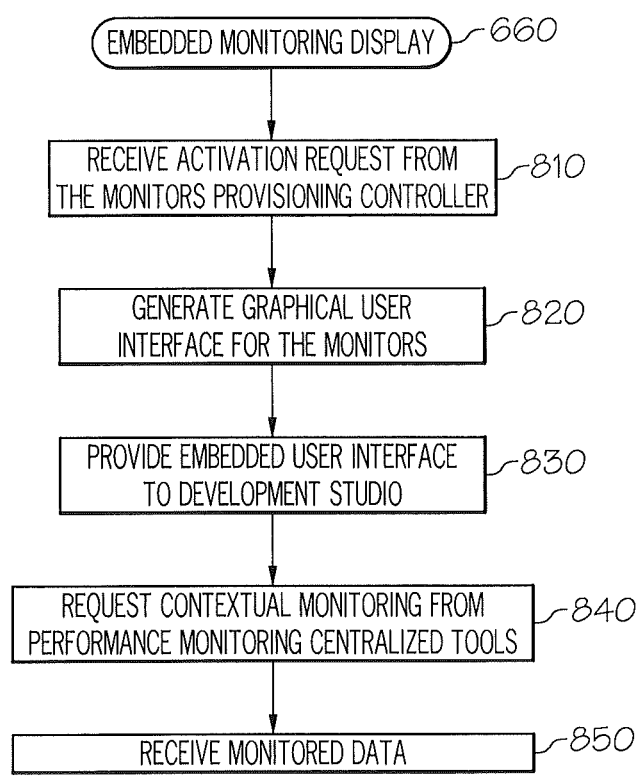
FIG. 8 is a flowchart of operations that may be performed by a translator according to various embodiments described herein.

The embedded monitoring display 660 can perform operations illustrated in the flowchart of FIG. 8. As shown in FIG. 8, the embedded monitoring display 660 receives an activation request from the monitoring provisioning controller 650 at Block 810 and generates an embedded Graphical User Interface (GUI) for the selected monitors, as illustrated at Block 820. The embedded GUI is provided either within the testing/development platform 600, or within an external production dashboard of the mashup application, at Block 830. The embedded monitoring display 660 receives the list of monitors from the monitors provisioning controller 650. At Block 840, the embedded monitoring display 660 provides the request for monitored data to the Application Performance Monitoring (APM) external system 630 of the PaaS environment, by providing the performance monitoring centralized tools 630 with a list of the selected monitors at Block 840, and receives back the monitored data at Block 850. At Block 840, the monitoring display 660 requests monitoring data that is relevant only to the specific monitored situational applications, whereas the underlying APM system 630 monitors all situational and non-situational (enterprise controlled) Web apps. The resulting UI gadgets can be integrated within the monitored mashup application as was illustrated at Block 830, as part of the UI of that situational app, or any other UI.

Returning to FIG. 6, a specific use case will now be described. For example, assume that the mashup application runtime environment 620 supports one hundred (100) different monitors. These monitors may be provided to the monitors graphical library 690 and to the potential match analyzer 670. A list of mashup application parts is also provided by the mashup application development studio 600 to the potential match analyzer 670. Assume in this use case that the potential match analyzer 670 determines that only fifteen (15) of the one hundred available monitors are usable with the particular mashup application being developed in the development studio 600. These fifteen monitors may then be presented to the monitors selection and configuration Block 640 for user selection from the list and/or for user selection of default monitors from the list. Assume that the user selects (or the defaults indicate) only two (2) of the fifteen monitors. These two monitors are then provided to the monitoring code generation Block 680 for instantiation, and target scripts for the two selected monitors may be provided to the mashup application development studio 600.

The two selected monitors and the fifteen available monitors are also provided to the performance monitoring centralized tool 630 via the performance monitoring controller 650 and the embedded monitoring display 660. In some embodiments, all fifteen monitors may be deployed by the performance monitoring centralized tool 630, but only the two selected monitors may be activated. However, since the unselected thirteen (13) monitors are also deployed, they can be selectively activated later, in response to a subsequent selection by the mashup application creator. Alternatively, in other embodiments, stubs or placeholders for the unselected thirteen monitors may also be placed in the mashup application by the mashup application development studio 600 when these unselected monitors are provided to the mashup application development studio 600 by the embedded monitoring display 660. In still other embodiments, the performance monitoring centralized tool 630 may only deploy and activate the two selected monitors, and may not deploy the thirteen unselected monitors. One or more of the thirteen unselected monitors may later be deployed and activated, if desired.

In view of the above, various embodiments described herein can improve or optimize the assignment (detection) of what monitors can be relevant to the developed mashup application. They can also selectively design (e.g., drag and drop) the recommended monitors for conditional approval. They can activate the situational application and the monitors at the same cycle by, for example, compiling system code and monitoring code and ad-hoc provision of monitoring agents, according to self-selection of the system and developers. The monitoring can be activated in production, selectively instrumenting part of the system that needs monitoring (but not necessarily all the application). Any and all of the above may be provisional with an automatic system, method or computer program product.

Accordingly, various embodiments described herein can provide reduced level of complexity for IT monitoring design and instantiation in mashup applications. They can be used by programmers and/or end users, not only by IT operation managers. This functionality can provide a visual programming addition to IT systems monitoring for mashup applications. It can be part of a mashup application composer, which is very different than app construction or a SOA orchestrator. Rather, mashup application design is more like visual programming.

Moreover, on demand and changing monitoring may be provided. For example an optimizer and proactive recommendation may be provided to recommend what monitor should be added, based on the type of embedded portlets or API, and the underlying supporting platform. A possible monitor may be recommended based on what it offers. The mashup application composer can then select to add or not to add a monitor, and the system can suggest all the possible configurations for the user to approve.

Recommendations and auto configuration may be processed on what and how to monitor, as well as scalability load reduction. Specifically, not all applications will have monitors. Monitoring is not part of the runtime platform at all times, yet, monitors can be installed on the fly, or removed, based on needs, life cycle (build, test, production), or allocated resource. Since mashup applications often deal with situational applications, and not big fixed systems, they can support, for example, only 20 users for 3 days, or 4 users for a year. When the scale is huge, monitoring cannot happen all the time, for every application. Thus, triggering and closing the needs enable high scalability of the platform, and "on a need to know only" basis.

On demand deployment of the selected monitors can also change over the life cycle of the mashup application. Namely, the developer can change the state (to monitor or not) based on the type of the situational application and usage, and based on the environment (in testing or production) to reduce scalability of monitoring.

Accordingly, various embodiments described herein can speed up development efficiency and accuracy, assist in selection, instrumentation, and lean activation of monitors and probes, and can automatically create reports for contextual performance monitoring within a specific mashup application composition or situational application. Performance monitors (such as CA® Application Performance Manager (APM) tools) may be dragged and dropped from a graphical library, into a Mashup application design space, such as in "MashArt", "DASHMASH" mashup environment, or CA Technologies® "AppLogic Design Studio". This sandbox design space enables inexperienced users to instrument (monitor) a desired input/output of the underlying services/parts of the situational application. User can also decide the nature of the monitor: permanent—namely in production, and/or transient—only in the testing/building/evaluating phase.

Similar to DASHMASH mashup environment with programmable Web, various embodiments described herein can provide integration points for IT monitoring (which monitor can be inserted, where, and how), simplifying the integration visually. Upon approval, the system weaves the probes (sensors) as part of the automated mashup application code generation. Upon deployment to the mashup application platform (as a PaaS or any other container), the system can provision the probes as well, and starts to generate the monitoring information as part of the development UI for the Mashup application, or the PaaS development studio.

Users can define the type of the monitor in terms of its lifespan (only in testing, or in production as well). In the case a production mode is selected as well, a relevant dashboard UI can be created, and can be integrated into an overall executive dashboard, or part of the situational application administrator console, if one is provided.

Various embodiments described herein can therefore provide graphical, drag-and-drop editing of IT assurance monitoring agents within rapid mashup application environments. They can enable professional and non-professional developers to rapidly instrument a mashup application system, and receive immediate monitoring data in order to incrementally increase the quality of situational applications. In some specific examples, users can set monitors to different parts of the mashup application or situational applications; receive default configuration, or recommended options for monitoring (what can be monitored); configure the monitors for the exact requested quality measurements, and set an output UI for both testing and production environments as integral or separate parts of the situational application/mashup application; seamlessly activate the monitoring agents as part of deploying the mashup application itself; be provided with the production/testing monitored data; and/or incrementally improve the mashup application by replacing services or change the mashup application structure.

Run-time modeling of ready to deployed monitoring tools within a PaaS development environment may be processed by assisting developers (programmers), not just IT architects. Thus, various embodiments described herein can utilize IT quality measurements as part of mashup application development, creating an IT-managed mashup application from the first stage of mashup application development.

Moreover, in addition to regular modeling, various embodiments described herein can proactively suggest matching between mashup application parts and monitoring agents. This matchmaking between monitored items and probes can reduce the time to configure and install monitoring agents.

The mashup application/situational application business process defines the scope of the monitored application. Various embodiments described herein can provide optimized partial monitoring data from a production environment, without the need to reinstall new probes for each application by separating the provisioning and the monitoring data.

PaaS development providers can also instrument monitoring tools into their domain, without changing the underlying PaaS structure except the design studio interface. In some embodiments, various embodiments described herein can be provided as a remote SaaS solution to the PaaS development provider.

Accordingly, various embodiments described herein can allow IT quality metrics and service assurance capabilities to be rapidly integrated into an application visual development environment, without the need for high-level of experience, sophistication or expensive labor. Quality data may be moved over a large amount of situational applications, without over-instrumenting each environment again and again. Feasible default integrations between mashup application parts/programmable Web services and service assurance may be recommended, simplifying configuration and installation for novice IT workers and sophisticated end-users. As a result, IT can support and leverage situational application emergence in enterprise IT. IT feedback can also be provided in a lean and small cycle of lightweight development processes, as part of a PaaS platform, providing embedded or external monitored information on production situational applications. Finally, a gap in rapid development can be closed to provide monitored information (not functional testing, rather quality, deployment testing), and adjusting it to be used by the masses.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, EIFFEL programming language, JADE, Emerald, C++, C#, VB.NET, PYTHON programming language or the like, conventional procedural programming languages, such as the "C" programming language, VISUAL BASIC programming language, Fortran 2003, PERL programming language, COBOL 2002, PHP, ABAP programming language, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart, illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

What is claimed is:

1. A method of operating a computer system comprising:
   accessing a library of mashup application performance monitors that are part of a mashup application runtime environment of a mashup application development environment;
   analyzing a mashup application that is being created in the mashup application development environment relative to the mashup application performance monitors in the library of mashup application performance monitors;
   identifying matching ones of the mashup application performance monitors that are applicable to the mashup application that is being created in the mashup application development environment, responsive to the analyzing;
   presenting the matching ones of the mashup application performance monitors that are applicable to the mashup application that is being created in a mashup application development environment, at a user device for selection; and
   instructing the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment, wherein the matching ones of the mashup application performance monitors that are applicable to the mashup application that is being created in the mashup application development environment comprise default mashup application performance monitors that are applicable to the mashup application that is being created in the mashup application development environment, and that are included in the selected ones of the mashup application performance monitors unless deselected.

2. The method according to claim 1 wherein the instructing the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment further comprises:

instantiating the selected ones of the mashup application performance monitors;

generating performance monitoring scripts for the selected ones of the mashup application performance monitors; and providing the performance monitoring scripts to the mashup application development environment.

3. The method according to claim 2 wherein the instantiating the selected ones of the mashup application performance monitors comprises instantiating the selected ones of the mashup application performance monitors according to a selected configuration, responsive to selection of a configuration for the selected ones of the mashup application performance monitors.

4. The method according to claim 1 further comprising: instructing the mashup application development environment how to provision the selected ones of the mashup application performance monitors in the mashup application that is being created in the mashup application development environment, responsive to a selection of provisioning options for the selected ones of the mashup application performance monitors.

5. A method of operating a computer system comprising:

identifying mashup application performance monitors that are applicable to a mashup application that is being created in a mashup application development environment;

instructing the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment;

identifying a first subset of the selected ones of the mashup application performance monitors that will be active during testing of the mashup application that is being created and not active during production of the mashup application that is being created, responsive to a selection of provisioning options for the selected ones of the mashup application performance monitors;

identifying a second subset of the selected ones of the mashup application performance monitors that will be active during production of the mashup application that is being created and not active during testing of the mashup application that is being created, responsive to the selection of provisioning options for the selected ones of the mashup application performance monitors that were identified;

converting the first and second subsets of mashup application performance monitors into graphical user displays; and instructing a performance monitoring tool of the mashup application development environment to populate the graphical user displays during testing and production of the mashup application that is being created.

6. A computer program product comprising:

a non-transitory computer readable storage medium having computer readable program code embodied therewith, the computer readable program code comprising:

computer readable program code to access a library of mashup application performance monitors that are part of a mashup application runtime environment of a mashup application development environment;

computer readable program code to analyze a mashup application that is being created in the mashup application development environment relative to the mashup application performance monitors in the library of mashup application performance monitors;

computer readable program code to identify matching ones of the mashup application performance monitors that are applicable to the mashup application that is being created in the mashup application development environment, responsive to the computer readable program code to analyze;

computer readable program code to present the matching ones of the mashup application performance monitors that are applicable to the mashup application that is being created in a mashup application development environment, at a user device for selection; and computer readable program code to instruct the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment, wherein the matching ones of the mashup application performance monitors that are applicable to the mashup application that is being created in the mashup application development environment comprise default mashup application performance monitors that are applicable to the mashup application that is being created in the mashup application development environment, and that are included in the selected ones of the mashup application performance monitors unless deselected.

7. The computer program product according to claim 6 wherein the computer readable program code to instruct the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment further comprises:

computer readable program code to instantiate the selected ones of the mashup application performance monitors;

computer readable program code to generate performance monitoring scripts for the selected ones of the mashup application performance monitors; and computer readable program code to provide the performance monitoring scripts to the mashup application development environment.

8. The computer program product according to claim 7 wherein the computer readable program code to instantiate the selected ones of the mashup application performance monitors comprises computer readable program code to instantiate the selected ones of the mashup application performance monitors according to a selected configuration, responsive to selection of a configuration for the selected ones of the mashup application performance monitors.

9. The computer program product according to claim 6 further comprising: computer readable program code to instruct the mashup application development environment how to provision the selected ones of the mashup application performance monitors in the mashup application that is being created in the mashup application development environment, responsive to a selection of provisioning options for the selected ones of the mashup application performance monitors.

10. A computer program product comprising:

a non-transitory computer readable storage medium having computer readable program code embodied therewith, the computer readable program code comprising:

computer readable program code to identify mashup application performance monitors that are applicable to a mashup application that is being created in a mashup application development environment;

computer readable program code to instruct the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment;

computer readable program code to identify a first subset of the selected ones of the mashup application performance monitors that will be active during testing of the mashup application that is being created and not active during production of the mashup application that is being created, responsive to a selection of provisioning options for the selected ones of the mashup application performance monitors;

computer readable program code to identify a second subset of the selected ones of the mashup application performance monitors that will be active during production of the mashup application that is being created and not active during testing of the mashup application that is being created, responsive to the selection of provisioning options for the selected ones of the mashup application performance monitors that were identified;

computer readable program code to convert the first and second subsets of mashup application performance monitors into graphical user displays; and computer readable program code to instruct a performance monitoring tool of the mashup application development environment to populate the graphical user displays during testing and production of the mashup application that is being created.

11. A computer system comprising:

a library of mashup application performance monitors that are part of a mashup application runtime environment of the mashup application development environment;

a potential match analyzer to analyze a mashup application that is being created in a mashup application development environment relative to the mashup application performance monitors in the library of mashup application performance monitors;

a mashup application analyzer to identify matching ones of the mashup application performance monitors that are applicable to the mashup application that is being created in the mashup application development environment, responsive to the potential match analyzer;

a presenter to present the matching ones of the mashup application performance monitors that are applicable to the mashup application that is being created in the mashup application development environment, at a user device for the selection; and an instructor to instruct the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment, wherein the matching ones of the mashup application performance monitors that are applicable to the mashup application that is being created in a mashup application development environment comprise default mashup application performance monitors that are applicable to the mashup application that is being created in the mashup application development environment, and that are included in the selected ones of the mashup application performance monitors unless deselected.

12. The computer system according to claim 11 wherein the instructor is further to:

instantiate the selected ones of the mashup application performance monitors; generate performance monitoring scripts for the selected ones of the mashup application performance monitors; and provide the performance monitoring scripts to the mashup application development environment.

13. The computer system according to claim 12 wherein the instructor is further to instantiate the selected ones of the mashup application performance monitors according to a selected configuration, responsive to selection of a configuration for the selected ones of the mashup application performance monitors.

14. The computer system according to claim 11 further comprising:

a provisioner to instruct the mashup application development environment how to provision the selected ones of the mashup application performance monitors in the mashup application that is being created in the mashup application development environment, responsive to a selection of provisioning options for the selected ones of the mashup application performance monitors.

15. A computer system comprising:
- a mashup application analyzer to identify mashup application performance monitors that are applicable to a mashup application that is being created in a mashup application development environment;
- an instructor to instruct the mashup application development environment to embed selected ones of the mashup application performance monitors into the mashup application that is being created in the mashup application development environment, responsive to a selection of the selected ones of the mashup application performance monitors from the mashup application performance monitors that are applicable to the mashup application that is being created in the mashup application development environment;
- a provisioning controller to identify a first subset of the selected ones of the mashup application performance monitors that will be active during testing of the mashup application that is being created and not active during production of the mashup application that is being created and to identify a second subset of the selected ones of the mashup application performance monitors that will be active during production of the mashup application that is being created and not active during testing of the mashup application that is being created, responsive to a selection of provisioning options for the selected ones of the mashup application performance monitors;
- a converter to convert the first and second subsets into graphical user displays and to instruct a performance monitoring tool of the mashup application development environment to populate the graphical user displays during testing and production of the mashup application that is being created.

* * * * *